May 1, 1945.  R. M. CARRIER, JR  2,374,663
METHOD OF AND APPARATUS FOR CONVEYING
Original Filed July 20, 1942  3 Sheets-Sheet 2

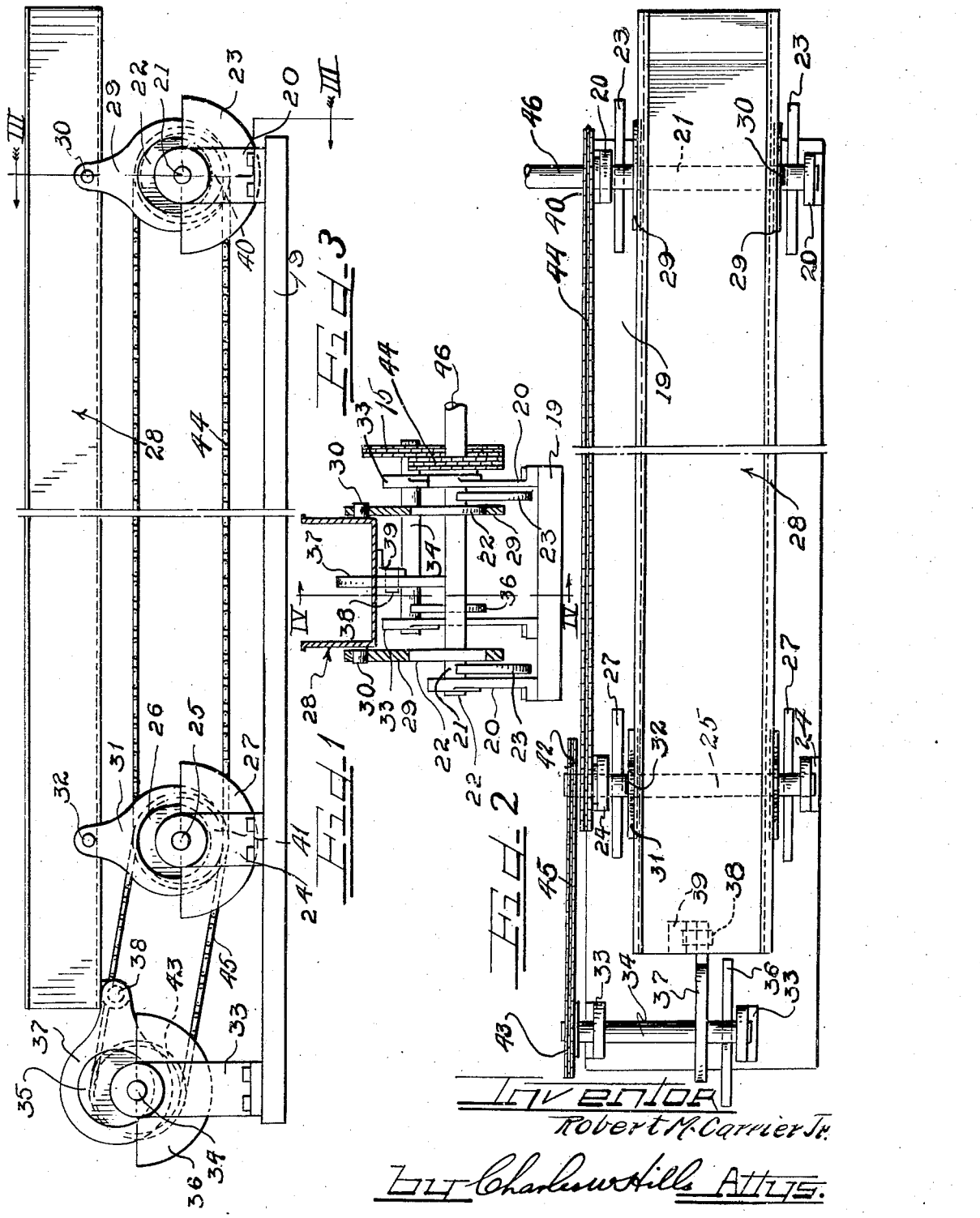

Inventor
Robert M. Carrier Jr.
by Charles W. Hill Attys.

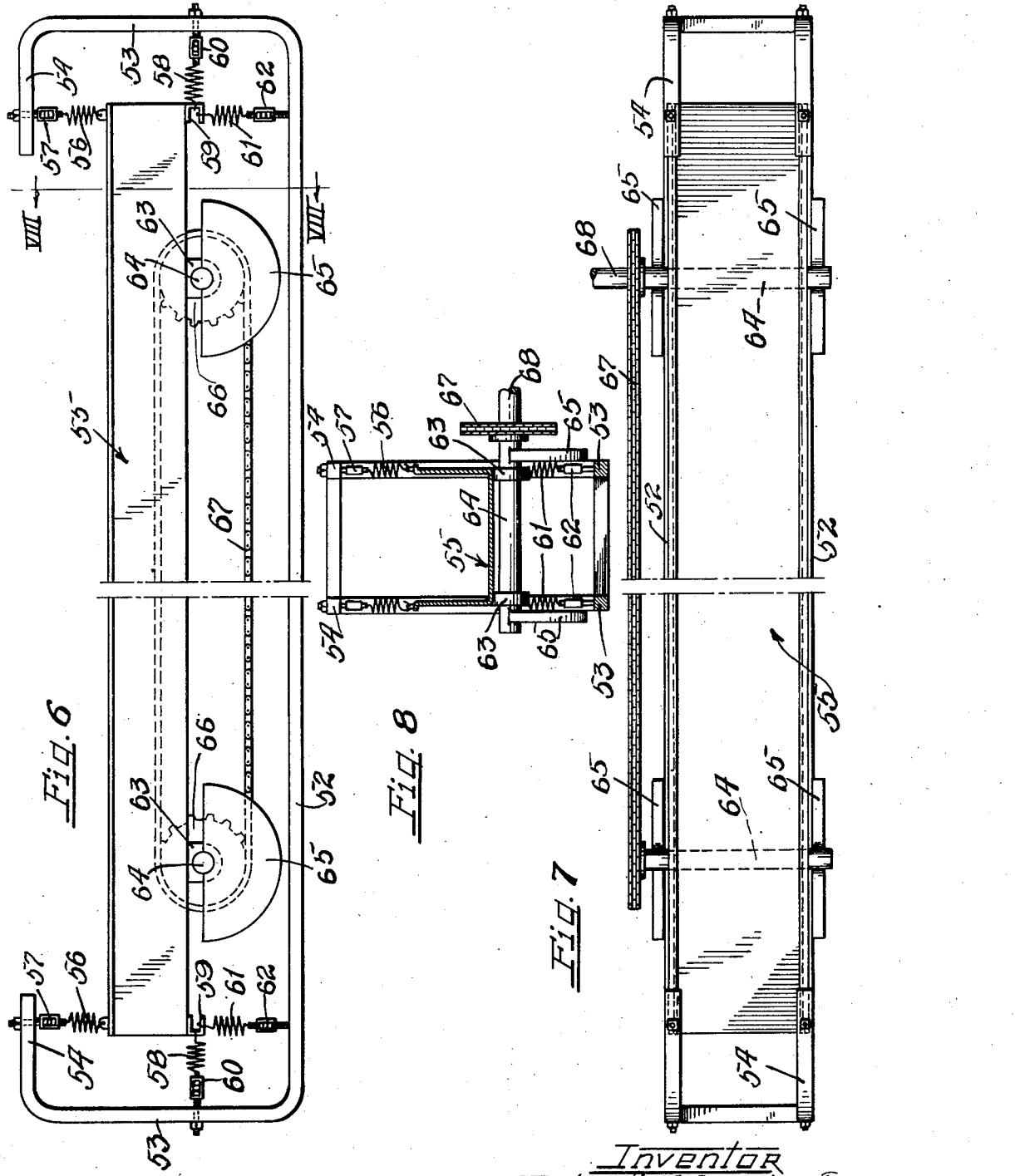

UNITED STATES PATENT OFFICE 2,374,663

METHOD OF AND APPARATUS FOR CONVEYING

Robert M. Carrier, Jr., Aurora, Ill.

Original application July 20, 1942, Serial No. 451,659. Divided and this application March 29, 1943, Serial No. 480,934

2 Claims. (Cl. 198—220)

This invention relates to improvements in methods of and apparatus for conveying, and more particularly to the conveying of discrete material from one point to another, on the same or different planes of elevation, although the invention may have other uses and purposes as will be apparent to one skilled in the art.

This application is a division of my copending application entitled "Method of conveying bulk materials," filed July 20, 1942, Serial No. 451,659.

In the past, many and various types of vibratory, oscillatory and gyratory conveyors have been developed. In most instances, the formerly known devices were merely vibrators arranged to successively bounce or throw the conveyed material off the surface of the conveyor and permit it to move downwardly as the result of the force of gravity acting upon the material. These conveyors would not move material horizontally or up an incline, nor would they move the material continuously in a smooth uniform flow along either a straight path or laterally curvate path. In other instances devices of this type have been developed to move material up an incline. There was no continuity of movement, but a step by step travel, such devices not being reversible, very limited in speed of flow, usually could not be counterbalanced, and in every instance of which I am aware the devices were not possible of correlation between the speed of movement of the conveyor itself and amplitude or throw in the event the conveyor was moved bodily through a cyclic endless path. Formerly known devices of this character were also objectionable due to their cumbersomeness, excessive cost of manufacture and operation, and the important fact that the material could not be moved in a continuous, smooth, uniform and rapid flow, and, if so desired, the material during any movement could not be kept substantially in contiguous relationship or actual contact with the conveying surface at all times.

With the foregoing in mind, it is an important object of the instant invention to provide a conveying method and apparatus which operates upon a new principle under which the apparatus is capable of continuously, smoothly, uniformly and rapidly conveying material downwardly, horizontally, or up an incline of any desired slope up to a degree not greatly exceeding the angle of repose for the material.

Another object of the invention is the provision of a conveying apparatus embodying a conveyor surface which is moved bodily through an endless oval path and which moves material forwardly in a continuous and uninterrupted flow.

It is also an object of this invention to provide a method of and apparatus for conveying embodying a conveyor surface moved bodily through an endless oval path and having its parts so correlated that the conveyed material is constantly in contiguous relationship or substantially in contact with the conveyor surface at all times.

A feature of the invention resides in the provision of conveying apparatus embodying a conveying member performing cyclic revolutions through an endless oval path and which revolves or rotates oppositely to the direction of material flow, that is, if the conveyor member moves generally clockwise, the material moves from right to left, and if the conveyor member moves counter-clockwise, the material flows from left to right.

Another feature of the invention resides in the provision of a conveying system embodying a conveying member actuated through an endless oval path to convey material, the apparatus being reversible by merely reversing the power drive for the conveying member.

Still another object of the invention resides in the provision of a conveying system wherein the material is moved forwardly by the action of a conveying member operated through an endless oval path, and wherein the movement of the material is independent at all times of the free force of gravity as a cause of material movement and wherein the material is only positively carried forward during movement through the lower half of the oval and in the direction of such movement; the material during the upper half of the oval movement being projected forward by momentum.

Still a further feature of the invention resides in the provision of conveying apparatus embodying a conveying member actuated through an endless oval path to advance material, the apparatus being highly economical in construction and operation and capable of being counterbalanced or stabilized to suppress vibration in supporting structures.

It is also a feature of the invention to provide conveying apparatus wherein material is steadily advanced by virtue of alternate direct propulsion and momentum travel.

A further object of the invention resides in the provision of conveying apparatus embodying a conveying member performing cyclic revolutions through an endless oval path and so arranged that the conveyed material advances several times the length of the longest axis of the curvilinear path at each cyclic revolution.

Another object of the invention is the provision of a conveying system embodying a conveying member which travels through an endless curvilinear path generally oval or elliptical in configuration, and in which there is such correlation between the major and minor axes of the elliptical path, such correlation between the speed and the magnitude of movement of the conveying surface in a direction substantially normal to that surface, and such angular correlation between the major axis of the elliptical path and the conveying surface as to produce a continuous uninterrupted flow in the direction of movement through the lower half of the oval.

Still another feature of the invention resides in the provision of a conveying system wherein a conveying member is moved through an endless curvilinear path for the purpose of advancing material, which apparatus embodies a relatively low speed of operation for the conveying member, and yet has an extremely high capacity of material flow.

While some of the more salient features, characteristics and advantages of the instant invention have been above pointed out, others will become apparent from the following disclosures, taken in conjunction with the accompanying drawings, in which:

Figure 1 is a side elevational view of conveying apparatus embodying principles of this invention;

Figure 2 is a top plan view of the structure of Figure 1;

Figure 3 is a vertical sectional view taken substantially as indicated by the line III—III of Figure 1, looking in the direction of the arrows;

Figure 6 is a fragmentary view in side elevation of a still different form of conveying apparatus embodying principles of this invention;

Figure 7 is a fragmentary top plan view of the structure of Figure 6; and

Figure 8 is a transverse vertical sectional view taken substantially as indicated by the line VIII—VIII of Figure 6.

As shown on the drawings:

Figure 4:
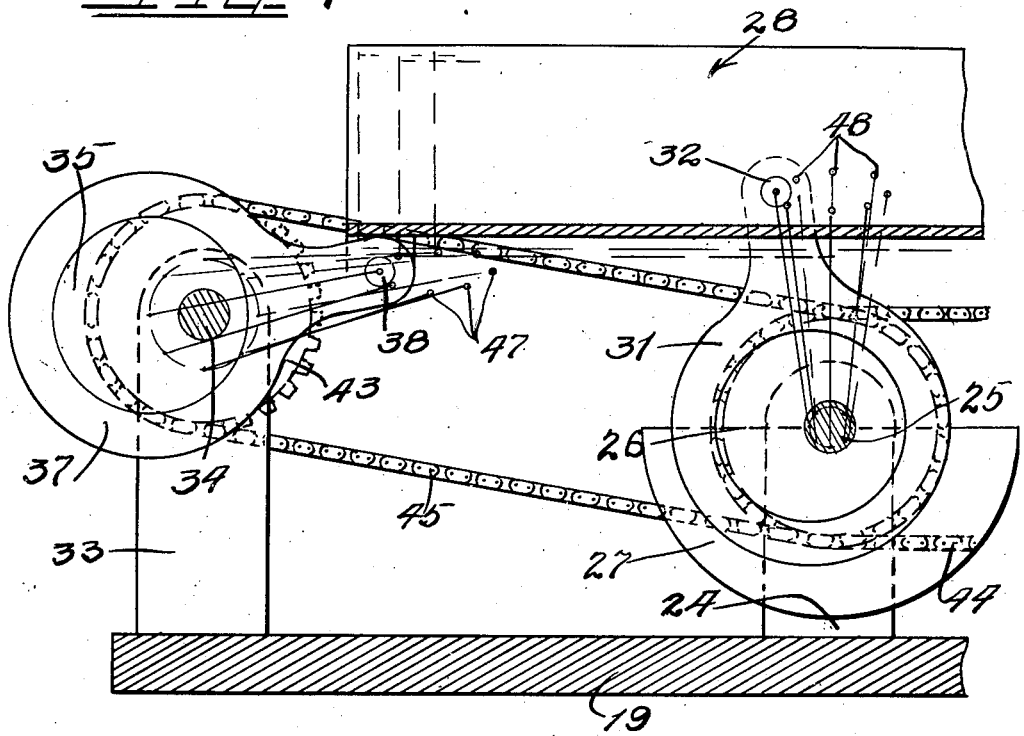
Figure 4 is an enlarged fragmentary vertical sectional view taken substantially as indicated by the line IV—IV of Figure 3 illustrating somewhat diagrammatically the operation of the structure seen in Figures 1, 2 and 3.

At the outset it should be noted that my novel method may be fully understood from the following description of an apparatus for practicing it.

For the purpose of clarity in presentation, each illustrated embodiment of the instant invention is shown horizontally and will so move material horizontally in either direction. It is to be understood, however, that any of the illustrated forms of the apparatus may be inclined, if so desired, or so constructed in an obvious manner that there is an inclination of the conveying member. If the conveying member is so inclined, the apparatus will function to convey material downwardly at substantially any angle at which some motivating force is necessary in addition to the action of gravity for a desired flow; or material may likewise be conveyed upwardly along any desired inclination up to a degree not greatly exceeding the angle of repose of the particular material.

It should be further understood that while straight trough-like conveying elements have been illustrated in each instance in order to facilitate adequate disclosure of the invention, the conveying element may have substantially any desired cross-sectional configuration, may be closed or open at the top, and be provided with a perforate or imperforate bottom depending on the type of conveying desired. In addition, it should be noted that the conveying element may have a laterally curvate shape, and thus convey material along an arcuate path downwardly, horizontally, or upwardly.

It will be understood that substantially any non-tacky and non-flocculent discrete material, such as gravel, crushed stone, sand, grain, vegetables, nuts, etc., may be effectively conveyed by the structures shown in the illustrated embodiments of this invention. Individual articles of greater size than particles of discrete material, both light and heavy, such as packages, boxes or bags of various substances, are equally transportable by conveying mechanism embodying this invention.

In that embodiment of this invention illustrated in Figures 1, 2, 3 and 4, there is shown a foundation or base 19. Near one end of this base a pair of transversely spaced bearing standards 20—20 are provided which rotatably carry a transverse shaft 21. This shaft is equipped with a pair of transversely spaced eccentrics 22—22, and outside of each of these eccentrics is a counterweight 23. Spaced longitudinally along the base 19 from the standards 20—20 is a similar pair of transversely spaced standards 24—24 which rotatably carry a shaft 25 which carries a pair of transversely spaced eccentrics 26—26, and outside of each eccentric the shaft carries a counterweight 27. The counterweights may be of any desired shape and, as shown, are disposed oppositely to the throw of the eccentrics so as to counterbalance the eccentric and stabilize the entire construction to prevent the transmission of vibrations to the foundation 19 and other supporting structures wherever the conveying apparatus may be located. The counterweights 23 and 27 are preferably alike, as are the eccentrics 22 and 26.

A conveyor or conveying member, generally indicated by numeral 28, and which for purposes of illustration is the same as the aforesaid conveyor 14, may be supported and actuated by means of the eccentrics 22 and 26.

Depending from each side of the conveyor 28 near one end thereof is a crank arm 29, pivotally connected to the conveyor as indicated at 30, and having a suitable aperture at its lower portion for the accommodation of the respective eccentric 22. Near the opposite end of the conveyor a pair of similar crank arms 31 are pivotally connected to the conveyor as indicated at 32, and these crank arms are suitably apertured to receive therein the eccentrics 26—26. The supporting and actuating structure thus far described associated with one end of the conveyor 28 is preferably identical with the corresponding structure at the other end of the conveyor.

In this instance, however, an additional actuating arrangement is provided to impart a greater longitudinal movement of the conveyor during its travel through its orbital path than can be provided by the eccentrics 22 and 26. This additional arrangement includes a pair of transversely spaced bearing standards 33—33 bolted or equivalently secured to the base 19 near an end thereof, and which standards are somewhat higher than the aforesaid standards 20 and 24. These standards 33 rotatably carry a shaft 34 provided with an eccentric 35 and a counterweight 36 of any desired configuration and oppositely disposed to the throw of the eccentric to counterbalance the action of the eccentric. A crank arm 37 suitably apertured to accommodate therein the eccentric 35 is pivotally connected at its free end as indicated at 38 to a bracket 39 on the bottom of the conveyor 28. While in the illustrated instance the bracket 39 is so disposed that the crank connection therewith is at the median line of the conveyor, it will be appreciated that if desired one or more additional eccentrics and crank arm connections may be established between the shaft 34 and the conveyor 28.

A uniform drive is imparted to all of the shafts 21, 25 and 34. The shaft 21 carries a sprocket wheel 40, the shaft 25 carries a pair of spaced sprocket wheels 41 and 42, and the shaft 34 carries a sprocket wheel 43, all of which sprocket wheels are of the same size. A chain 44 is trained over the sprocket wheels 40 and 41, and a chain 45 is trained over the sprocket wheels 42 and 43, so that all the shafts are driven at uniform speed. The shaft 21 extends outwardly as indicated at 46 for connection to any suitable form of prime mover, not illustrated in the drawings.

While the eccentrics 22 and 26, if operating alone, would impart a circular orbital path to the conveyor 28 as a whole in the same manner as the eccentrics 5 and 8 operate the conveyor 16 as above explained, the eccentric 35 provides an additional horizontal component in the movement of the conveyor. This arrangement causes the conveyor to be moved bodily through an endless curvilinear path of substantially elliptical shape. The proportions of this elliptical path, that is, the ratio between the minor and major axes of the ellipse, may be governed by the construction of the eccentrics 22 and 26 in relation with the eccentric 35. With the eccentrics 22, 26 and 35 substantially in phase, as illustrated, it is preferable to provide the eccentric 35 with a throw substantially three times that of the eccentrics 22 and 26, thereby resulting in an elliptical conveyor path in which the major axis of the ellipse is substantially three times the length of the minor axis. It has been found that this ratio of axes of the elliptical path is a highly satisfactory one for the rapid conveying of most materials. In connection with some materials, it may be desirable to employ a somewhat different ratio, depending on circumstances, but the preferable arrangement has been selected herein for illustrative purposes.

The operation of the instant invention can best be described in connection with the structure illustrated in Figures 1, 2 and 3 of the drawings, which is the structure that provides the endless elliptical path of travel for the conveyor.

With the instant invention, material may be conveyed in a continuous, smooth and substantially uniform flow downwardly, horizontally or upwardly along an inclination of substantially any degree up to a point not greatly exceeding the angle of repose for the respective material. The material moves at a very rapid rate in comparison with the cross-sectional area of the conveyor. In order to provide a continuous flow of material it is necessary that the arrangement be such as to permit particles of conveyed material to proceed forwardly by virtue of their momentum alternately with direct propulsions of the particles by the conveyor, in view of the fact that the conveyor must travel half its endless cyclic path oppositely to the flow of material. Further, during its continuous flow the material may be maintained in constant contiguity or in constant contact with the conveyor surface, as distinguished from types of conveyors which periodically toss or throw the material away from the conveyor surface and permit it to gravitate back thereon which results in a step by step advancement. This feature provides the added advantages of enabling the use of the conveyor for drying purposes as well as conveying so that the material will be uniformly subject to a drying action, prevents wear and tear on the conveyor by sharp and abrasive material, and prevents unintentional fragmentation of the conveyed material.

Assuming that all the foregoing features and advantages are desired in conveying apparatus wherein the conveyor moves bodily through an elliptical orbital path, in keeping with the principles of this invention, several factors are then determined in advance and the construction made to embody these factors so as to produce those features and advantages.

The proper correlation of axes of the orbital path at right angles to each other must be determined. In the case of an elliptical path, it has been found that for very rapid, yet continuous and smooth conveying, an elliptical path having a major axis substantially three times that of the minor axis is desirable. This is accomplished, as stated above, by making the eccentric 35 with three times the throw of the eccentrics 22 and 26. With reference to Figure 4, and with such construction, the eccentrics all being in phase, and all rotated at the same speed, the conveyor will be forced to move through an oval path. The point 38, which is the effective connection of the eccentric 35 with the conveyor, will pass through an orbital path diagrammatically illustrated by the small circles 47. This path is elliptical, and the major axis is substantially three times the length of the minor axis. Likewise, the pivot points 30 and 32 will each pass through an elliptical path indicated diagrammatically by the series of small circles 48. The paths 47 and 48 are identical. Consequently, any point on the conveyor will traverse the same elliptical orbital path.

The proper direction of cyclic revolutions for the conveyor to produce the desired direction of flow of material is also determined in advance. As diagrammatically illustrated in Figure 5, wherein the line 49 is an enlargement of the elliptical path of the conveyor and the arrows indicate the direction of cyclic revolution of the conveyor, the material flows left to right when the conveyor moves counterclockwise. Conversely, when the conveyor follows a cyclic path generally clockwise in direction, the material will move from right to left. If it is ever desired to reverse a direction of flow of material, it is simply necessary to reverse the direction of rotation of the prime mover. No change in the construction of the conveying apparatus is needed.

The proper angle of the major axis of the elliptical path relatively to the conveyor surface to best produce flow of material is also determined. In the case of the instant invention, it is preferable to have the major axis of the elliptical path parallel to the longitudinal axis of the conveyor surface, as indicated in both Figures 4 and 5. In the latter figure, the line 50 represents the conveyor surface, and this line also coincides with the major axis of the elliptical path. Of course, this exactness may not be practical at all times in commercial production, but for rapid and continuous and smooth flow of material, the major axis of an elliptical path should approximately parallel the longitudinal axis of the conveyor surface.

A somewhat critical range of speed, that is, the cyclic revolutions per minute, relatively to the throw of the conveyor in a direction substantially normal to the plane of the conveying surface is also determined in advance in order to acquire the results mentioned above. A satisfactory conveyor speed may be established by dividing 1 by the radius of a circular path or by ½ the minor axis of an elliptical path, taking the square root of the quotient and multiplying by 187.7. The speed so calculated may be varied approximately 30% either way in the case of an elliptical path with the major axis substantially twice the length of the minor axis, and approximately 40% either way for an elliptical path with the major axis substantially triple the length of the minor axis. For example, a satisfactory practical speed for an elliptical path with a ½ inch minor axis would be 375 cyclic revolutions per minute.

The foregoing is true regardless of whether the conveyor causes a flow of material horizontally or at an angle to the horizontal. If it is desired to position the conveyor at an angle to the horizontal, it is a simple expedient to lengthen or shorten the bearing standards until the conveyor is disposed at the right angle.

Figure 5:
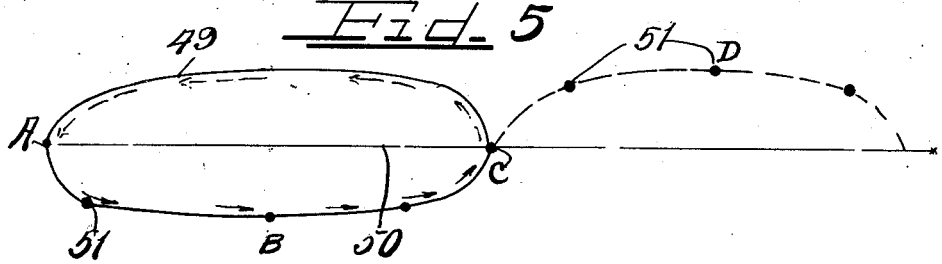
Figure 5 is a wholly diagrammatic view illustrating generally the cyclic movement of the conveyor surface and the travel of a particle of material therewith and relatively thereto.

During the cyclic movement of the conveyor centrifugal force and momentum alternately combine with and act against the force of gravity on the conveyed material. In Figure 5, the series of black dots 51 diagrammatically indicate the travel of a particle of conveyed material. At position A and at position C, opposite ends of the major axis of the elliptical path, the conveyor being now in mid-path position, the particle will bear against the conveyor surface with a pressure substantially equal to the weight of the particle.

When the particle is in position B, the lowermost portion of the path, it will bear against the conveyor with a pressure equal to substantially twice its weight, and when the particle is in position D, in the uppermost portion of the path, it will be in contiguity to or in contact with the conveyor surface, but the bearing pressure of the particle will be substantially nil.

Still with reference to Figure 5, it will be seen that a particle 51 is carried through the lower part of the cyclic path from position A to position C by the conveyor surface in the direction of material flow. In the upper part of the orbital path the same particle continues its forward motion by virtue of its momentum following a slightly undulating path through position D and on to mid-position when it is again physically carried by the conveyor moving through the lower part of its cycle. It will be noted that during the forward movement of the particle by momentum, the conveyor surface is moving rearwardly a distance equal to that from position C to position A relatively to the particle. Thus, the particle has an effective travel or an advance relatively to the conveyor surface of considerably more than twice the length of the major axis of the orbital path during one cyclic revolution of the conveyor.

When material is conveyed below the horizontal with gravity further aiding the flow, the conveying speed may increase above that resulting from horizontal conveying, and where the material is conveyed up an incline of any desired slope up to a degree not greatly exceeding the angle of repose of the material, there may be a lessening of conveying speed. In any case, however, the advance of the material will be continuous.

In Figures 6, 7 and 8 I have illustrated still another form of conveying apparatus embodying principles of the instant invention. In this construction there is shown a pair of laterally spaced parallel frame members 52—52 which are upwardly turned at each end as indicated at 53 and terminate in inwardly extending confronting portions 54. A conveyor, generally indicated by numeral 55, which for illustrative purposes is the same in construction as the above discussed conveyors 14 and 28, floats within the frame members on several sets of springs connected to the conveyor adjacent each end thereof. Each spring 56 of one set is connected at one end to the conveyor and at the other end through a turnbuckle connection 57 to one of the inward extensions 54 on the frame. Each spring 58 of another set is connected at one end to an attaching lug 59 on the conveyor and at the opposite end to a turn-buckle connection 60 or the equivalent to one of the upright portions 53 of the frame. Each spring 61 in the third illustrated set is connected at one end to a lug 59 on the conveyor and at the opposite end through a turn-buckle connection 62 or the equivalent to a base portion 52 on the frame.

Two pairs of bearings 63 depend from the bottom of the conveyor 55 and rotatably support a pair of transverse shafts 64 spaced longitudinally along the conveyor bottom. Each shaft carries a pair of counterweights 65—65 which may be of any desired configuration and which are all preferably similarly positioned on the respective shafts 64. The shafts are uniformly driven by identical sprocket wheels 66, one on each shaft, and a chain 67 trained over the sprocket wheels. One of the shafts is extended as indicated at 68 for connection to a suitable prime mover, not illustrated.

The arrangement is such that when the shafts 64 are rotated, the counterweights 65 exert thrusts upon the shaft, which thrusts are transmitted to the conveyor 55 and in turn resisted by the springs 56, 58 and 61. The springs 56 and 61 may have the same degree of elasticity, while the springs 58 are usually of a different elasticity in that event. By adjusting the turn-buckles 57, 60 and 62 to predetermined degrees, the thrusts of the counterweights 65 may be caused to move the conveyor 55 through an orbital path of substantially any desired curvilinear shape.

As the conveyor 55 travels its orbital path, material is conveyed thereby in the same manner as above explained.

In connection with the instant invention, the weight or size of particles of conveyed material, provided the material is not tacky, dust-like or flocculent, has substantially no bearing on the conveying as previously described, consistent with a constant speed of orbital movement of the conveyor.

In some instances, as with some materials, it may be desirable to throw the horizontal component of the conveyor drive out of phase with the vertical component to produce an irregular orbital path. This may be accomplished with the structure of Figures 1, 2 and 3, for example, by changing the angular relationship between the eccentrics 22 and 26 and the eccentric 35 and their respective shafts; and in connection with the structure in Figures 6, 7 and 8 by properly adjusting the turnbuckles.

From the foregoing, it is apparent that I have provided a novel and efficient conveying apparatus whereby material may be smoothly, rapidly and very economically conveyed in a continuous and substantially uniform flow, downwardly, horizontally, or upwardly, to a degree not greatly exceeding the angle of repose of the material. It is further apparent that during the conveying the material is never permitted to stop, but is permitted to travel by its own momentum between direct propulsions so that the advance is smooth and continuous and the material may be kept constantly in contiguous relationship or actual contact with the conveying surface at all times. It will be further understood that while the invention is illustrated in connection with a linear straight conveyor, the invention is equally inclusive of a conveying member having a laterally curved or warped surface as long as the axes of the orbital conveyor path are properly disposed with respect to the longitudinal axis of the conveyor surface, and material will be conveyed in a laterally curvate path in the same manner as along a straight path. It is further apparent that the invention includes a new and novel method of conveying material. In addition, it will be noted that conveying apparatus embodying principles of this invention is extremely economical to both manufacture and operate, and highly efficient and durable.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In an apparatus for conveying material to advance it forward in a substantially continuous stream on a support, motivating means associated with the support for oscillating the same, and means connecting the motivating means to the support to oscillate the same through a closed path of generally oval shape in a substantially vertical plane, the major axis of which oval is substantially parallel to the conveying surface of the support, said connecting means imparting motion of such magnitude and said motivating means operating the same at such speed that the material on the support is only positively carried forward by the support during only the lower half of each oval movement and thereafter during the upper half of the oval movement is projected forward by the momentum stored up in it during the said lower half of the movement whereby the material is advanced over a substantially continuous sinuous-like path in which the lower lobes of the path extend below the plane of the major axis of the oval, and in which the upper lobes of the path extend above said plane, said motivating means continuously repeating the oval cycle of movement to advance the material in a generally continuous stream in which substantially all of the particles follow said sinuous-like path.

2. In a method of conveying material to advance it forward in a substantially continuous stream on a support which includes the steps of subjecting the support to a generally oval oscillatory motion in a substantially vertical plane and in which the major axis of the oval is substantially parallel to the conveying surface of the support, and proportioning the magnitude of the oval and the speed of oscillation so that such motion is translated to the material to positively carry the material forward in the direction of the movement during the lower half of each oval movement and to lessen the frictional adherence of the material to the support during the upper half of each oval movement whereby the material is then projected forward by momentum resulting in a substantially continuous flow through a wavy serpentine path.

ROBERT M. CARRIER, Jr.